US012638368B2

(12) United States Patent
Hickman Guevara et al.

(10) Patent No.: US 12,638,368 B2
(45) Date of Patent: May 26, 2026

(54) VEHICLE BODY PANEL DEFLECTION TEST DEVICE AND METHOD

(71) Applicant: Ford Motor Company, Dearborn, MI (US)

(72) Inventors: Alfonso Hickman Guevara, Tlalnepantla (MX); Victor Jose Cisneros Moreno, Mexico City (MX); Nelson Raúl Santoni Noriega, Tultitlán (MX); Cuauhtemoc Quiroz Garfias, Mexico City (MX); Luis Antonio Ocegueda Pérez, Ecatepec de Morelos (MX); Joab Aziel Montiel Escamilla, Ecatepec de Morelos (MX)

(73) Assignee: Ford Motor Company, Dearborn, MI (US)

( * ) Notice: Subject to any disclaimer, the term of this patent is extended or adjusted under 35 U.S.C. 154(b) by 308 days.

(21) Appl. No.: 18/430,276

(22) Filed: Feb. 1, 2024

(65) Prior Publication Data

US 2026/0009706 A1      Jan. 8, 2026

(51) Int. Cl.
*G01N 3/08* (2006.01)
*G01N 3/06* (2006.01)

(52) U.S. Cl.
CPC .............. *G01N 3/08* (2013.01); *G01N 3/066* (2013.01); *G01N 3/068* (2013.01)

(58) Field of Classification Search
CPC .......... G01N 3/066; G01N 3/068; G01N 3/08
See application file for complete search history.

(56) References Cited

U.S. PATENT DOCUMENTS

| | | | | |
|---|---|---|---|---|
| 4,982,609 A | * | 1/1991 | Talley, III | G01N 3/08 |
| | | | | 73/849 |
| 10,573,012 B1 | | 2/2020 | Collins et al. | |
| 2015/0276569 A1 | * | 10/2015 | Turturro | G01N 33/346 |
| | | | | 73/821 |
| 2021/0253273 A1 | * | 8/2021 | Okada | G05B 19/418 |

FOREIGN PATENT DOCUMENTS

| | | | | |
|---|---|---|---|---|
| CN | 102944469 | 2/2013 | | |
| CN | 109443670 | 3/2019 | | |
| CN | 114199691 A | * 3/2022 | | G01N 3/12 |
| CN | 115112508 | 9/2022 | | |
| KR | 20230032089 A | * 3/2023 | | G01M 99/007 |

OTHER PUBLICATIONS

Machine translation of CN 114199691 (Year: 2023).*
Machine translation of KR 20230032089 (Year: 2023).*

* cited by examiner

*Primary Examiner* — Nathaniel J Kolb
(74) *Attorney, Agent, or Firm* — Burris Law, PLLC

(57) ABSTRACT

A test device and method can include a frame, a force applicator, and a force sensor. The frame includes a first handle, second handle, and main body. The handles extend from a perimeter of the main body and are configured to be gripped by an operator's hands. The main body includes a housing portion and support portion. The housing portion is configured to hold a display device such that a display screen of the display device is visible from a rear side of the main body. The support portion is disposed on a front side of the main body. The force applicator extends forward away from the support portion. The force sensor is mounted to the support portion and couples the force applicator to the support portion. The force sensor is configured to detect a push and/or pull force applied via the force applicator to a location on an object.

20 Claims, 6 Drawing Sheets

VEHICLE BODY PANEL DEFLECTION TEST DEVICE AND METHOD

FIELD

The present disclosure relates to a test device and method for determining deflection of a vehicle body panel.

BACKGROUND

The statements in this section merely provide background information related to the present disclosure and may not constitute prior art.

Vehicle body panels are typically tested to determine their resilience to deflection or deformation from push and/or pull loads. Often, more than one location on a panel is tested and a vehicle includes many such panels. Each test typically requires considerable setup including positioning dial indicators on a complex frame and affixing the frame to the ground or vehicle and then operating a manual force gauge. This setup is typically repeated for each location tested on the vehicle and can be very time consuming and can be prone to variation between each setup.

The teachings of the present disclosure address these and other issues with vehicle body panel deflection testing.

SUMMARY

This section provides a general summary of the disclosure and is not a comprehensive disclosure of its full scope or all of its features.

In one form, the present disclosure provides a test device including a frame, a force applicator, and a force sensor. The frame includes a first handle, a second handle, and a main body. The first and second handles extend from a perimeter of the main body and are configured to be gripped by opposite hands of an operator. The main body includes a housing portion and a support portion. The housing portion is configured to hold a display device such that a display screen of the display device is visible from a rear side of the main body. The support portion is disposed on a front side of the main body. The force applicator extends in a forward direction away from the support portion. The force sensor is mounted to the support portion and couples the force applicator to the support portion. The force sensor is configured to detect a push and/or pull force applied via the force applicator to a location on an object.

According to a variety of forms of the test device of the above paragraph, which may be incorporated individually or in any combination thereof: the test device further includes a data acquisition module mounted to the support portion, the data acquisition module being in electrical communication with the force sensor to receive signals from the force sensor indicative of the push and/or pull force; the test device further includes at least one non-contact sensor supported by the main body and configured to measure distance to the location on the object; the at least one non-contact sensor includes a stereoscopic camera; the main body defines an aperture open through the front and rear sides of the main body and aligned with the housing portion and configured to provide a line-of sight between a non-contact sensor on a rear side of the display device and the location on the object; the support portion includes a reinforcement member that extends longitudinally in a lateral direction that is perpendicular to the forward direction, the reinforcement member having a total length in the lateral direction, a total width in the forward direction, and a total thickness in a direction that is perpendicular to the lateral and forward directions, wherein the total length is greater than the total width and the total width is greater than the total thickness; the force sensor is mounted to the reinforcement member; the test device further includes a data acquisition module mounted to the reinforcement member, the data acquisition module being in electrical communication with the force sensor to receive signals from the force sensor indicative of the push and/or pull force; the housing portion includes four corner brackets, each corner bracket configured to engage two sides of a corresponding corner of the display device; the first handle is located on a left side of the main body and the second handle is located on a right side of the main body; the frame weighs less than or equal to 2 kg.

In another form, the present disclosure provides a test device including a frame, a force applicator, a force sensor, and a data acquisition module. The frame includes a first handle, a second handle, and a main body. The first and second handles extend from a perimeter of the main body and are configured to be gripped by opposite hands of an operator. The main body includes a housing portion and a support portion. The housing portion is configured to hold a display device such that a display screen of the display device is visible from a rear side of the main body. The support portion is disposed on a front side of the main body. The force applicator extends in a forward direction away from the support portion. The force sensor is mounted to the support portion and couples the force applicator to the support portion. The force sensor is configured to detect a push and/or pull force applied via the force applicator to a location on an object. The data acquisition module is mounted to the support portion. The data acquisition module is in electrical communication with the force sensor to receive signals from the force sensor indicative of the push and/or pull force.

According to a variety of forms of the test device of the above paragraph, which may be incorporated individually or in any combination thereof: the test device further includes at least one non-contact sensor supported by the main body and configured to measure distance to the location on the object; the support portion includes a reinforcement member that extends longitudinally in a lateral direction that is perpendicular to the forward direction, the reinforcement member having a total length in the lateral direction, a total width in the forward direction, and a total thickness in a direction that is perpendicular to the lateral and forward directions, wherein the total length is greater than the total width and the total width is greater than the total thickness, wherein the force sensor is mounted to the reinforcement member.

In still another form, the present disclosure provides for a method of testing a vehicle panel including supporting a force applicator, a force sensor, a data acquisition module, at least one non-contact sensor, and a display device on a frame, wherein the frame includes a main body that includes a housing portion and a support portion, wherein the display device is mounted to the housing portion such that a display screen of the display device is visible from a rear side of the main body, wherein the support portion is disposed on a front side of the main body, wherein the force applicator is mounted to the support portion and extends in a forward direction therefrom. The method includes positioning the frame such that the force applicator contacts the vehicle panel. The method includes moving the frame relative to the vehicle panel until the vehicle panel deforms or until a force detected by the force sensor reaches a predetermined threshold force. The method includes measuring a deflection amount of the vehicle panel with the non-contact sensor during the step of moving the frame relative to the vehicle panel.

According to a variety of forms of the method of the above paragraph, which may be incorporated individually or in any combination thereof: the step of moving the frame relative to the vehicle panel includes pushing the frame toward the vehicle panel to press the vehicle panel with the force applicator; the step of moving the frame relative to the vehicle panel includes pulling the frame away from the vehicle panel to pull the vehicle panel with the force applicator; the at least one non-contact sensor includes a stereoscopic camera; the stereoscopic camera is in communication with the display device and the display device is configured to display at least one of: images from the stereoscopic camera, video from the stereoscopic camera, and distance data based on input from the stereoscopic camera; the method further includes placing coordinate markings on the vehicle panel, wherein the at least one non-contact sensor is configured to detect the coordinate markings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
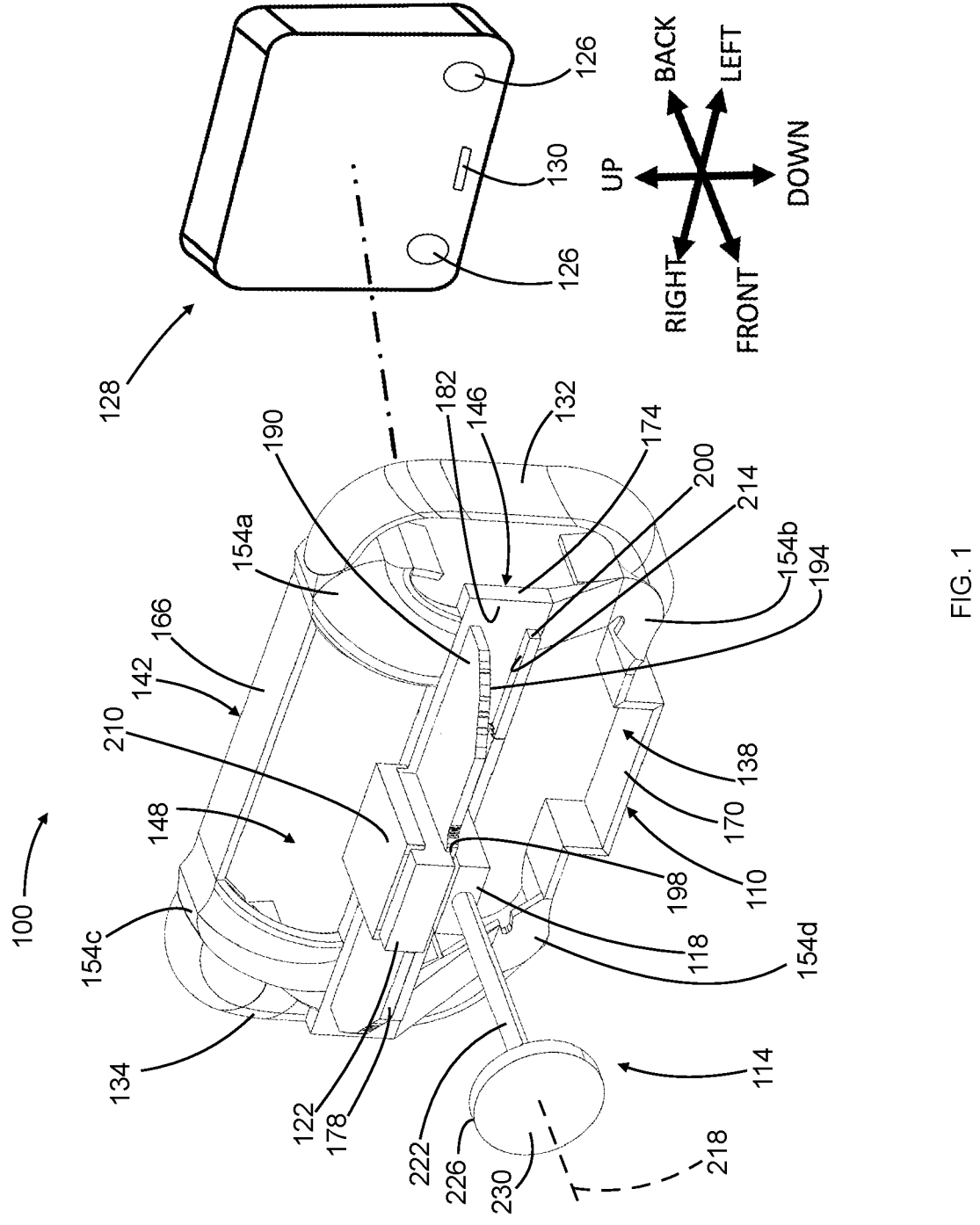
FIG. 1 is an exploded perspective view of a test device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a test device 100 is illustrated. The test device 100 includes a frame 110, a force applicator 114, and a force sensor 118. The test device 100 may also include a data acquisition module 122 mounted to the frame 110. The test device 100 also includes at least one non-contact sensor 126 mounted to the frame 110. The test device 100 may also optionally include a display device 128. The test device 100 may also optionally include a microphone 130.

Figure 2:
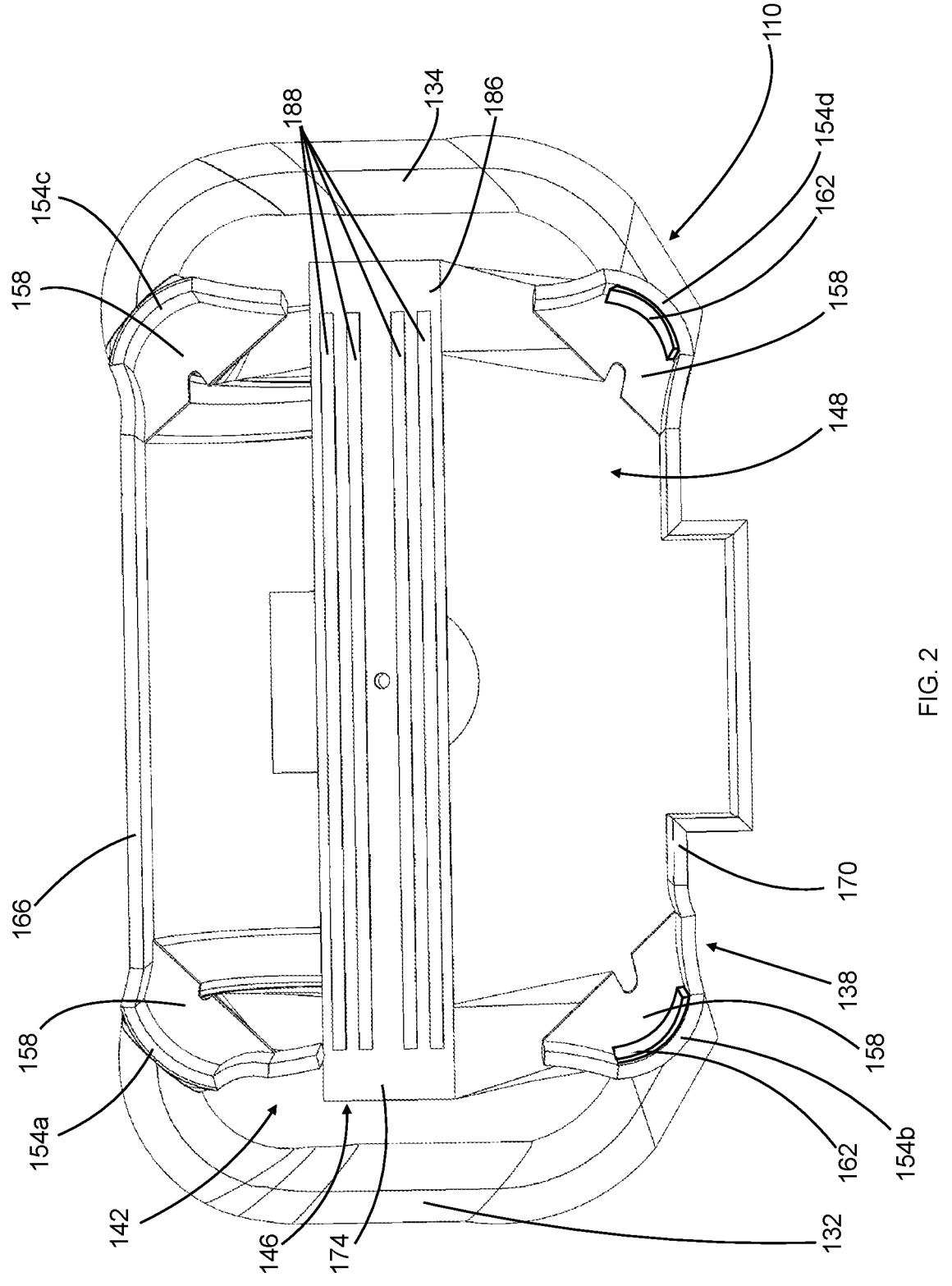
FIG. 2 is a perspective view of a portion of the test device of FIG. 1.

Referring to FIGS. 1 and 2, the frame 110 includes a first handle 132, a second handle 134, and a main body 138. The first handle 132 and the second handle 134 extend from a perimeter of the main body 138 and are configured to be gripped by opposite hands of an operator (a person; not shown). The first handle 132 extends from a left side of the main body 138 and is, thus, also referred to herein as the left handle 132. The second handle 134 extends from a right side of the main body 138 and is, thus, also referred to herein as the right handle 134.

The main body 138 includes a housing portion 142 and a support portion 146. The housing portion 142 is configured to hold the display device 128 in a space 148 defined by the housing portion 142. The housing portion 142 is open through the rear side of the main body 138 so that a display screen 150 (FIG. 4) of the display device 128 is visible from the rear of the main body 138. The housing portion 142 can be configured to permit the display device 128 to be removably mounted to the housing portion 142. In the example provided, the housing portion 142 is configured to permit the display device 128 to be inserted into the space 148 from the rear of the main body 138.

In the example provided, the housing portion 142 includes four corner brackets (i.e., top left corner bracket 154a, bottom left corner bracket 154b, top right corner bracket 154c, and bottom right corner bracket 154d, collectively or generically referred to herein as corner brackets 154) and at least one front surface 158. The at least one front surface 158 inhibits the display device 128 from moving further forward once positioned in the space 148. In the example provided, separate front surfaces 158 are located at each corner bracket 154, though other configurations can be used. Each corner bracket 154 is configured to wrap around a corresponding corner of the display device 128 to contact two sides of a perimeter of the display device 128 to locate the display device 128 in the left, right, up, and down directions of the frame 110. The display device 128 can be secured to the housing portion 142 in the space 148 in any suitable manner.

In one form, resilient pads 162 are disposed in one or more of the corner brackets 154 and are sized and positioned such that pressing the display device 128 into the space 148 deforms the resilient pads 162. The resilient pads 162 can then hold the display device 128 in the space 148 by friction and/or pressure from their resiliency such as by biasing the display device 128 toward the other corner brackets 154 and/or the at least one front surface 158 for example. In another form, straps (not specifically shown) can secure the display device 128 to the housing portion 142. In still another form, fasteners (not shown) can secure the display device 128 to the housing portion 142.

In the example provided, the housing portion 142 also includes a top cross-member 166 and a bottom cross-member 170. The top cross-member 166 spans in a lateral direction (i.e., left-to-right) to connect a top portion of the top left corner bracket 154a to a top portion of the top right corner bracket 154c. The bottom cross-member 170 spans in the lateral direction to connect a bottom portion of the bottom left corner bracket 154b to a bottom portion of the bottom right corner bracket 154d.

In the example provided, the first handle 132 is coupled directly to the top left corner bracket 154a and the bottom left corner bracket 154b and is spaced apart from the main body 138 therebetween. In the example provided, the second handle 134 is attached to the top right corner bracket 154c and the bottom right corner bracket 154d and is spaced apart from the main body 138 therebetween.

The support portion 146 is located forward of the top cross-member 166 and the bottom cross-member 170 and is located, in the vertical direction (i.e., up-and-down) between the top cross-member 166 and the bottom cross-member 170. The support portion 146 is coupled to and spans between the corner brackets 154.

In the example provided, the support portion 146 includes a base member 174 and a reinforcement member 178. The base member 174 can be a substantially flat plate such that the base member 174 has a length in the lateral direction (i.e., left-right) greater than a height in the vertical direction (i.e., up-down) and has a depth (i.e., in the front-back direction) that is less than either the length or the height. In one form, the base member 174 has a substantially rectangular shape when viewed from the front or back. The base member 174 is coupled to a lower-front portion of the top left corner bracket 154a and to a lower-front portion of the top right corner bracket 154c and spans in the lateral direction therebetween. The base member 174 is coupled to an upper-front portion of the bottom left corner bracket 154b and to an upper-front portion of the bottom right corner bracket 154d and spans in the lateral direction therebetween. In other words, the base member 174 can be a substantially flat plate having planar front surface 182 and a planar rear surface 186 that are perpendicular to the front-back direction. The planar rear surface 186 may optionally include reinforcement ribs 188 configured to strengthen (i.e., stiffen) the base member 174 in the forward-backward direction. In the example provided, the reinforcement ribs 188 extend longitudinally in the lateral direction (left-right) of the frame 110 to overlap in the lateral direction on the left with the top left corner bracket 154a and the bottom left corner bracket 154b and overlap in the lateral direction on the right with the top right corner bracket 154c and the bottom right corner bracket 154d.

The reinforcement member 178 is coupled to the base member 174 and provides structural reinforcement of the base member 174 to strengthen (i.e., stiffen) the base member 174 in the front-back directions. In the example provided, the reinforcement member 178 is a substantially flat plate such that the reinforcement member 178 has a length in the lateral direction (i.e., left-right) that is greater than a depth (i.e., in the front-back direction) and has a height (i.e., up-down) that is less than the depth. In one form, the reinforcement member 178 can have a substantially rectangular shape when viewed from above or below and may have a substantially rectangular cross-section when viewed from the left or right. In other words, the reinforcement member 178 can be a substantially flat plate having a planar top surface 190 and a planar bottom surface 194 that are perpendicular to the up-down direction. A rear of the reinforcement member 178 is coupled to the front surface 182 and the reinforcement member 178 extends forward therefrom.

The reinforcement member 178 can span laterally (i.e., left-right) a majority of the length of the base member 174. In the example provided, the reinforcement member 178 spans from left to right to overlap in the lateral direction with the top left corner bracket 154a and the bottom left corner bracket 154b on the left side and to overlap in the lateral direction with the top right corner bracket 154c and the bottom right corner bracket 154d on the right side.

In the example provided, the frame 110 may optionally also include a lower reinforcement member 200. In the example provided, the lower reinforcement member 200 is a substantially flat beam such that the lower support member 200 has a length in the lateral direction (i.e., left-right) that is greater than a depth (i.e., in the front-back direction). In one form, the lower reinforcement member 200 has a height (i.e., up-down) that is equal to the depth. In another form, the height of the lower reinforcement member 200 is less than the depth. In still another form, the height of the lower reinforcement member 200 may be greater than the depth. In one form, the lower reinforcement member 200 can have a substantially rectangular shape when viewed from above or below and can have a substantially rectangular or square cross-section when viewed from the left or right. In other words, the lower reinforcement member 200 can be a substantially flat plate or beam having a planar top surface 214 that is perpendicular to the up-down direction. A rear of the lower reinforcement member 200 is coupled to the front surface 182 and the lower reinforcement member 200 extends forward therefrom.

The lower support member 200 can span laterally (i.e., left-right) a majority of the length of the base member 174. In one form, the lower reinforcement member 200 may span the same length as the reinforcement member 178, though other configurations may be used. In the example provided, the lower reinforcement member 200 spans from left to right to overlap in the lateral direction with the top left corner bracket 154a and the bottom left corner bracket 154b on the left side and to overlap in the lateral direction with the top right corner bracket 154c and the bottom right corner bracket 154d on the right side.

The frame 110 can be formed of any suitable material, e.g., polymer, composite, metal, plastic. In one form, the entire frame 110 is formed of the same material and is 3D printed (i.e., additive manufacturing) or molded. The frame 110 can be unitarily formed as a single piece or may be formed as multiple pieces coupled together using any suitable method (e.g., welding, fasteners, adhesive). In another form, the reinforcement member 178 and/or the base member 174 may be a different material than the rest of the frame 110.

The force sensor 118 is mounted to the support portion 146 and located centered in the lateral direction. In the example provided, the force sensor 118 is in contact with the planar bottom surface 194 of the reinforcement member 178 and attached thereto (e.g., via adhesive, fasteners, or a bracket not shown). The force sensor 118 may also be in contact with the front surface 182 of the base member 174. In the example provided, the force sensor 118 is located in the vertical direction between the reinforcement member 178 and the lower reinforcement member 200.

The data acquisition module 122 is mounted to the support portion 146. In the example provided, the data acquisition module 122 is located centered in the lateral direction, though other configurations can be used. In the example provided, the data acquisition module 122 is in contact with the planar top surface 190 of the reinforcement member 178 and attached thereto. In the example provided the data acquisition module 122 is secured to the planar top surface 190 via an optional support bracket 210 of the support portion 146. Alternatively, or in addition to, the data acquisition module 122 may be attached via another suitable attachment manner (e.g., via adhesive, fasteners).

The planar top surface 190 may optionally define an upper recess 198 in which a bottom of the data acquisition module 122 may be received. The support bracket 210 may extend from the base member 174 and/or the reinforcement member 178 and contact the top surface of the data acquisition module 122. In the example provided, the support bracket 210 also contacts left and right side surfaces of the data acquisition module 122.

In alternative configuration, not specifically shown, the planar bottom surface 194 can define a recess in which the force sensor 118 may be received. In still another configuration, the force sensor 118 and the data acquisition module 122 may be swapped such that the force sensor 118 is mounted to the planar top surface 190 and the data acquisition module 122 is mounted to the planar bottom surface 194.

Force applicator 114 is attached to the force sensor 118 and extends in the forward direction therefrom. The force applicator 114 is configured to engage a surface 220 (FIGS. 5-7) and transmit force in an axial direction along a force axis 218 (corresponding to the front-back direction) to the force sensor 118.

Figure 5:
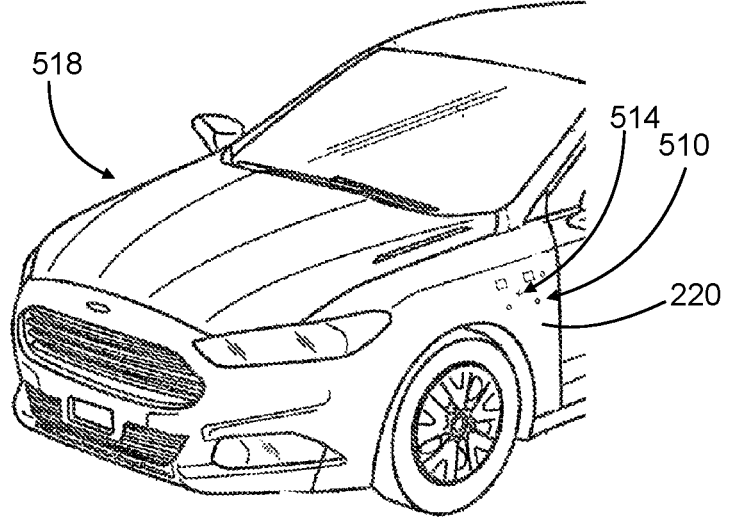
FIG. 5 is a perspective view of a vehicle including a panel to be tested with the test device of FIG. 1, according to the present disclosure.
Figure 6:
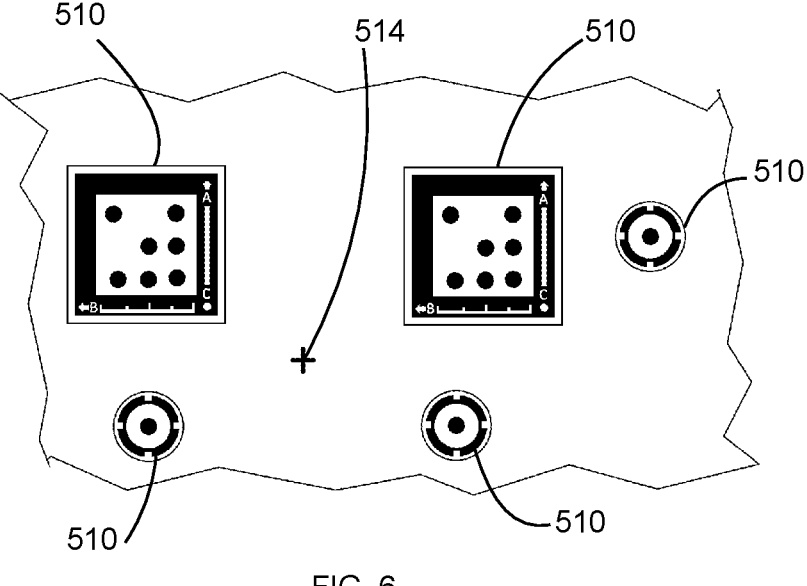
FIG. 6 is a plan view of a portion of the panel of FIG. 5.
Figures 7, 8, 9:
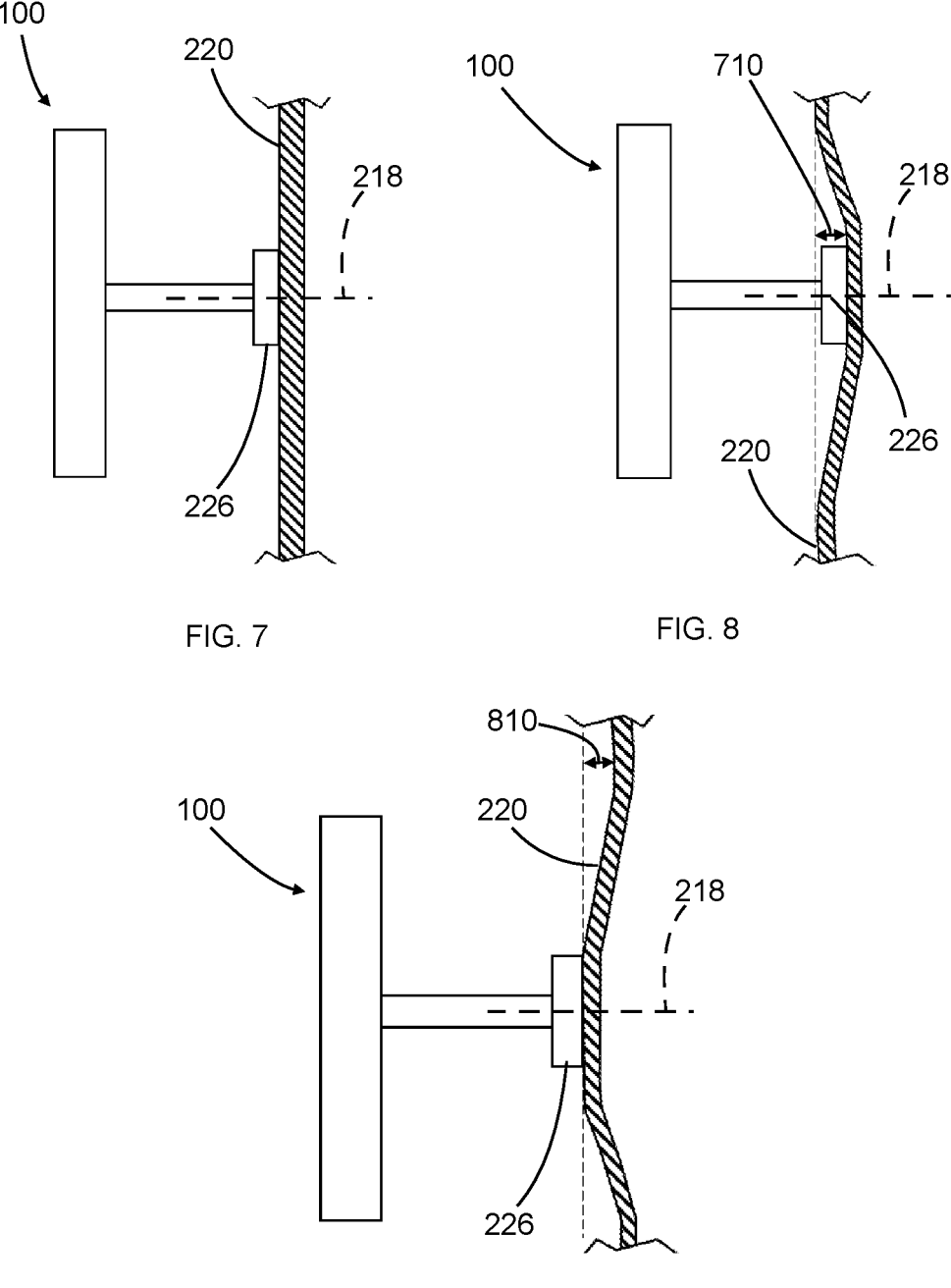
FIG. 7 is a cross-sectional view of the panel of FIG. 5 illustrated with the test device of FIG. 1 in a first position according to the present disclosure.
FIG. 8 is a cross-sectional view of the panel of FIG. 5 illustrated with the test device of FIG. 1 in a second position according to the present disclosure.
FIG. 9 is a cross-sectional view of the panel of FIG. 5 illustrated with the test device of FIG. 1 in a third position according to the present disclosure.

In the example provided, the force applicator 114 includes a shaft 222 and may optionally include an endpiece 226. The shaft 222 is a rigid material. A proximal end of the shaft 222 is coupled to the force sensor 118 and the shaft 222 extends forward therefrom to a distal end. The endpiece 226 is coupled to the distal end of the shaft 222. The endpiece 226 has a forward surface 230 configured to contact the surface 220 (FIGS. 5-7) to which force is to be applied. In an alternative form, not specifically shown, the endpiece 226 may be excluded and the end of the shaft 222 directly contacts the surface 220 (FIGS. 5-7) to which force is to be applied. In another alternative, not specifically shown, the endpiece 226 may be separate from the shaft 222 and connected (e.g., by magnetism, adhesive, or suction) to the surface 220 (FIGS. 5-7) and the end of the shaft 222 can contact the endpiece 226 to apply force to the surface 220 (FIGS. 5-7). In one form, the endpiece 226 may be a round, disc shaped body centered on the shaft 222, though other shapes may be used. In one form, the forward surface 230 is a flat surface perpendicular to the force axis 218, though other configurations can be used, such as a convex surface or a concave surface.

The endpiece 226 may be formed of any suitable material, including but not limited to plastic, polymer, metal, composite. In one form, the forward surface 230 of the endpiece 226 is defined by a pad (not specifically shown) attached to the rest of the endpiece 226. Such a pad may be configured to inhibit scratching of the surface 220 (FIGS. 5-7) to which force is to be applied, e.g., a layer of fabric, rubber, or resilient material, and/or to conform to the surface 220 (e.g., if the surface 220 is non-planar). In one form, the endpiece 226 may include a magnet configured to be attracted to the surface 220 (FIGS. 5-7) to which force is to be applied such that a pulling force may be applied thereto. In another form, the endpiece 226 may include a suction cup that defines the forward surface 230 such that a pulling force may be applied to the surface 220 (FIGS. 5-7) to which force is to be applied.

The force sensor 118 can be any suitable type of sensor configured to detect push and/or pull forces applied to it via the force applicator 114, such as a force transducer, for example.

Figure 3:
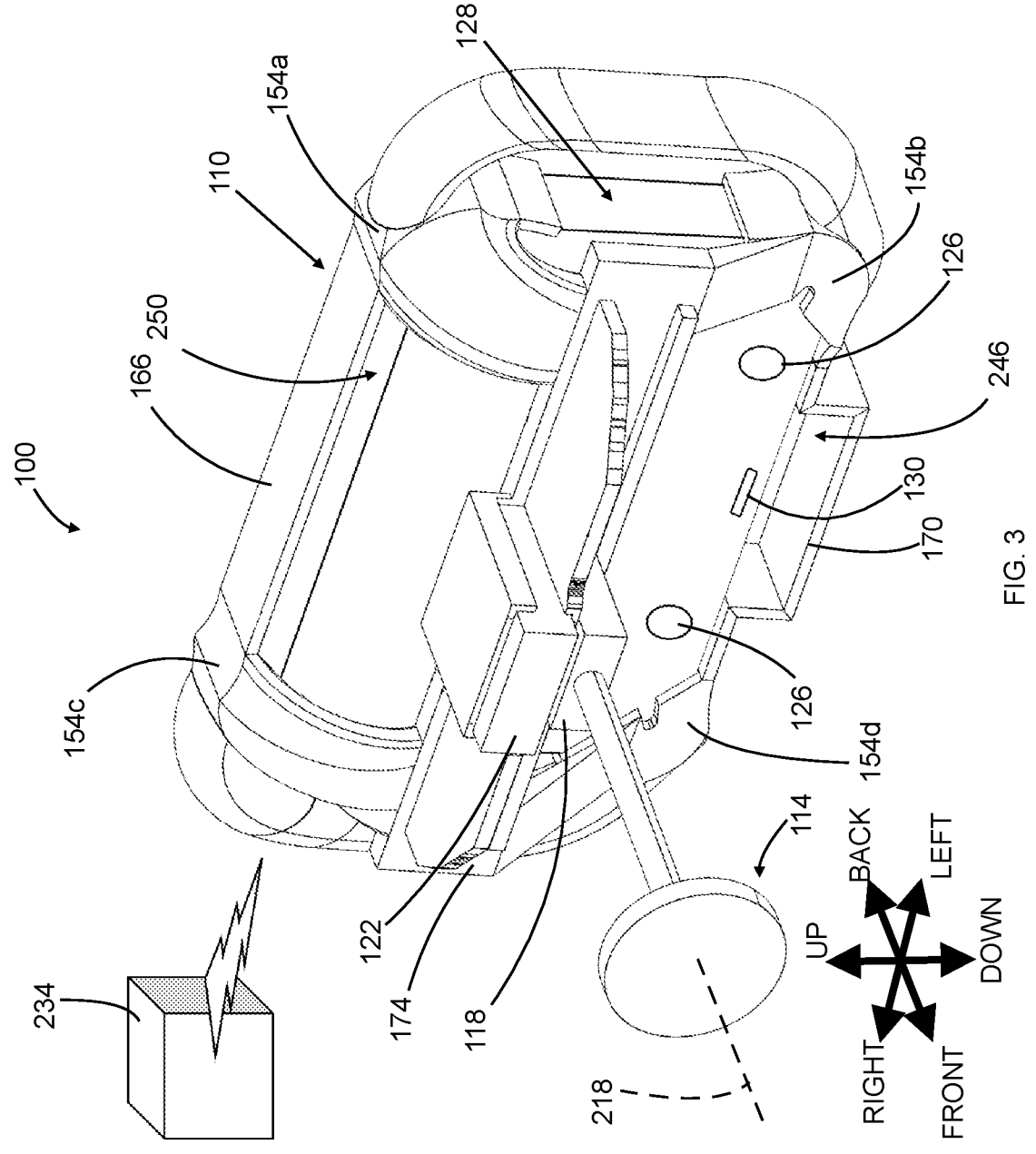
FIG. 3 is a perspective view of the test device of FIG. 1.

Referring to FIG. 3, the data acquisition module 122 is in communication with the force sensor 118 such as via a wired connection or a wireless connection. The data acquisition module 122 is configured to receive signals from the force sensor 118 indicative of the force applied along the force axis 218. The data acquisition module 122 may translate those signals into data. In one form, the data acquisition module 122 can also be in communication (e.g., wired or wireless) with an external device 234 such as a computer, tablet, phone, or network device for example to transmit the data thereto in real-time. Additionally, or alternatively, the data acquisition module 122 may optionally be in communication with the display device 128. In another form, the data acquisition module 122 may store the data to be transmitted to the external device 234 at a later time.

The at least one non-contact sensor 126 can be any suitable type of non-contact sensor or sensors that are configured to detect an amount of deflection of the surface 220 (FIG. 5) without the sensor contacting the surface 220 when the force is applied to the surface 220 via the force applicator 114. In one form, the non-contact sensor 126 includes a stereo camera, also referred to as a stereoscopic camera or 3D camera, that has two or more lenses spaced apart a predetermined distance and is configured to detect three-dimensional positioning of the features imaged. In another form, other sensors may be used, such as lasers (e.g., lidar), radar, microwave, or sonar, for example. The non-contact sensor(s) 126 are mounted to the frame 110 and positioned to face the forward direction to detect the deflection of the surface 220 when the surface 220 is pressed or pulled via the force applicator 114.

In the example provided, the non-contact sensor(s) 126 are positioned laterally between the left corner brackets (i.e., top left corner bracket 154a, bottom left corner bracket 154b) and the right corner brackets (i.e., top right corner bracket 154c, bottom right corner bracket 154d). In the example provided, the non-contact sensor(s) 126 are positioned below the base member 174 and above the bottom cross-member 170. As such, the non-contact sensor(s) are visible from the front of the frame 110 through a lower aperture 246 defined by the bottom left corner bracket 154b, the bottom right corner bracket 154d, the base member 174, and the bottom cross-member 170. The top left corner bracket 154a, the top right corner bracket 154c, the base member 174, and the top cross-member 166 can also define an upper aperture 250 open through the front of the frame 110. In an alternative form, not shown, the non-contact sensor(s) 126 can be located above the base member 174 and below the top cross-member 166, such that the non-contact sensor(s) 126 are visible from the front of the frame 110 through the upper aperture 250.

The non-contact sensor(s) 126 are in communication with a device and configured to send signals indicative of the deflection of the surface 220 to the device. In one form, the device is the data acquisition module 122 and the non-contact sensor(s) 126 send these signals to the data acquisition module 122. In this form, the data acquisition module 122 may and/or interpret those signals and send corresponding signals and/data to the external device 234. In the example provided, the non-contact sensor(s) 126 are attached to or otherwise disposed on the forward-facing surface of the display device 128 and the display device 128 can receive signals from the non-contact sensor(s) 126.

Figure 4:
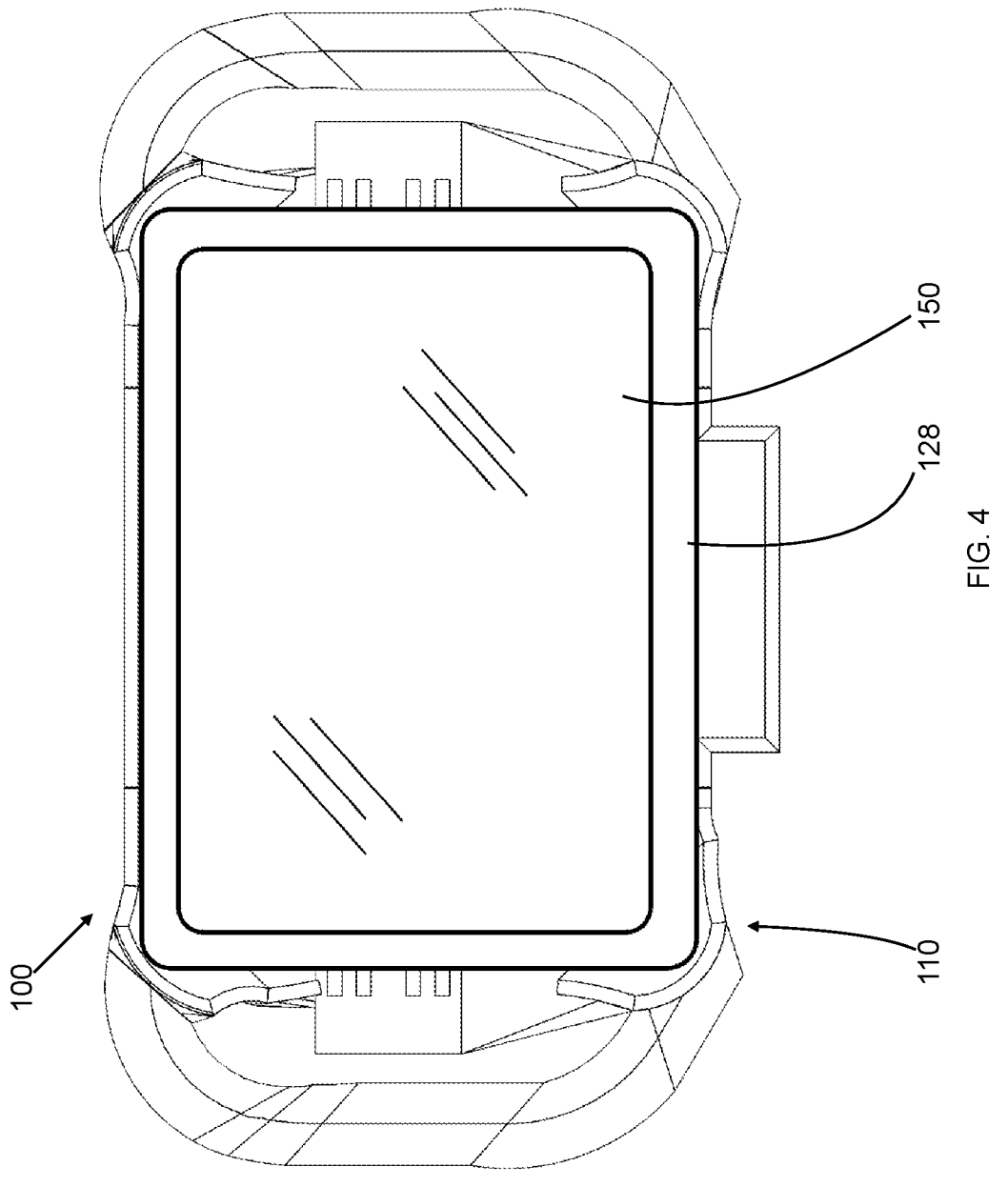
FIG. 4 is a rear view of the test device of FIG. 1.

Referring to FIG. 4, the display device 128 can be configured to display images and/or data on its display screen 150 representative of the deflection of the surface 220 (FIG. 5). For example, the display screen 150 may show a video and/or static images of the surface 220 and/or text indicating deflection values. The display device 128 can also transmit the deflection data to the external device 234 (FIG. 3) via a wired or wireless connection. In one form, the display device 128 directly transmits the data to the external device 234. In another form, the display device 128 can transmit the data to the data acquisition module 122 (FIGS. 1 and 3), which can transmit the data to the external device 234. The display screen 150 may optionally be a touch-screen.

Referring to FIG. 5, the surface 220 can be prepared by placing locating features 510 on the surface 220 near a location 514 that will be contacted and deflected by the endpiece 226 (FIG. 1). These locating features 510 can be calibration or coordinate markings. In the example provided, these features 510 are appliques (e.g., stickers, decals, magnets) removably applied to the surface 220 that act as coordinate markings. In another form, the features 510 may be permanent features of the surface 220. The location 514 that will be contacted and deflected by the endpiece 226 can also be marked, and in the example provided, is marked by a plus symbol, though any other markings can be used, such as but not limited to an "x", a target, a dot, or a circle.

In the example provided, the surface 220 is an external body panel of a vehicle 518, though other types of surfaces on or off a vehicle may be tested. In the example provided, the surface 220 is a fender or front quarterpanel of the vehicle 518 though other body panels may be tested (e.g., door panels, hood).

Referring to FIG. 6, some examples of the features 510 are shown in greater detail. The features 510 can include shapes and/or colors that are known dimensions and placed within the field of view of the sensor(s) 126 (FIG. 1) when the endpiece 226 (FIG. 1) engages the surface 220. The sensor(s) 126 are configured to detect the features 510 and the display device 128 (FIG. 1) and/or the external device 234 can be configured to use the features 510 to determine the position of the test device 100 (FIG. 1) relative to the surface 220 and accurately determine deflection of the surface 220 when pushed or pulled via the force applicator 114.

Referring to FIG. 7, the test device 100 is schematically illustrated in contact with the surface 220 in a rest state before any force is applied. In this state, the operator (not shown) holds the first handle 132 (FIG. 1) and the second handle 134 (FIG. 1) to position the test device 100 so that the endpiece 226 contacts the surface 220 and the force axis 218 is perpendicular to the surface 220.

Referring to FIG. 8, the user (not shown) can move the test device 100, from the position shown in FIG. 7, forward to deflect the surface 220 in the forward direction until a predetermined force value is achieved. The user can then release the force (i.e., return the test device 100 in the rearward direction) and remove the test device 100 from the surface 220.

Referring to FIG. 9, the user (not shown) can move the test device 100, from the position shown in FIG. 7, rearward to deflect the surface 220 in the rearward direction until a predetermined force value is achieved. In order to produce this pull force, the endpiece 226 can be coupled to the surface 220 such as via adhesive, suction cup, magnet, fastener, or other manner. The user can then release the force (i.e., return the test device 100 in the forward direction) and remove the test device 100 from the surface 220.

When applying the push force (FIG. 8) or pull force (FIG. 9), the display device 128 (FIG. 3) can be configured to display an indicator of the force being applied and/or to display or audibly indicate when the predetermined force has been achieved. While deflecting the surface 220 forward (FIG. 8) or rearward (FIG. 9), the non-contact sensor(s) 126 detect the deflection (i.e., distance 710 shown in FIG. 7, or distance 810 shown in FIG. 8) of the surface 220 from its original position (FIG. 7) during the application of force.

The non-contact sensor(s) 126 (FIG. 3) can detect the maximum deflection, i.e., at the predetermined force value. The non-contact sensor(s) 126 can also detect any deflection that remains after the test device 100 is removed from the surface 220.

The predetermined force can be any suitable value and can be based on the material properties of the surface 220, the location on the vehicle 518 (FIG. 5), the geometry of the surface 220, thickness of the surface 220, type of panel that the surface 220 makes up, and expected real-world forces that the surface 220 may encounter, among other factors. In one form, the predetermined force may be greater than or equal to 500 newtons. In another form, the predetermined force may be less than 500 newtons.

The deflection data can be displayed on the display screen 150 (FIG. 4) and/or transmitted to the external device 234 (FIG. 3).

In one form, the external device 234 (FIG. 3) can analyze the deflection data and determine if it falls within predetermined acceptable tolerances. If the deflection data is outside the acceptable tolerances, the external device 234 may output an indicator that the panel (i.e., surface 220) has not passed the test. This indicator may be a visual indicator, an audible indicator, a flag (e.g., a repair ticket) in a database that can trigger further action (e.g., repair of the surface 220, further inspection, change in manufacturing process of the surface 220).

The microphone 130 (FIG. 3) can optionally record sound (i.e., audio data) during the deflection and release process. This audio data can also be transmitted to the external device 234 (FIG. 3). The external device 234 can analyze this audio data and compare it to known audio data (e.g., stored on the external device 234 or retrieved from another device). If the recorded audio data matches (within predetermined tolerances) audio data known to be unacceptable, then the external device 234 may output an indicator that the panel (i.e., surface 220) has not passed the test. This indicator may be a visual indicator, an audible indicator, a flag (e.g., a repair ticket) in a database that can trigger further action (e.g., repair of the surface 220, further inspection, change in manufacturing process of the surface 220). In other words, if the panel makes a sound during deflection or release, that is unacceptable (e.g., oil canning sound), then the surface 220 can be flagged as not having passed the test.

Thus, the test device 100 and test method of the present disclosure permits many locations on a vehicle to be tested quickly and accurately without complicated test fixture setup.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A test device comprising:
a frame including a first handle, a second handle, and a main body, the first and second handles extending from a perimeter of the main body and being configured to be gripped by opposite hands of an operator, wherein the main body includes a housing portion and a support portion, the housing portion being configured to hold a display device such that a display screen of the display device is visible from a rear side of the main body, wherein the support portion is disposed on a front side of the main body;
a force applicator extending in a forward direction away from the support portion; and
a force sensor mounted to the support portion and coupling the force applicator to the support portion, the force sensor being configured to detect a push or pull force applied via the force applicator to a location on an object.

2. The test device of claim 1, further comprising a data acquisition module mounted to the support portion, the data acquisition module being in electrical communication with the force sensor to receive signals from the force sensor indicative of the push or pull force.

3. The test device of claim 1, further comprising at least one non-contact sensor supported by the main body and configured to measure distance to the location on the object.

4. The test device of claim 3, wherein the at least one non-contact sensor includes a stereoscopic camera.

5. The test device of claim 1, wherein the main body defines an aperture open through the front and rear sides of the main body and aligned with the housing portion and configured to provide a line-of sight between a non-contact sensor on a rear side of the display device and the location on the object.

6. The test device of claim 1, wherein the support portion includes a reinforcement member that extends longitudinally in a lateral direction that is perpendicular to the forward direction, the reinforcement member having a total length in the lateral direction, a total width in the forward direction, and a total thickness in a direction that is perpendicular to the lateral and forward directions, wherein the total length is greater than the total width and the total width is greater than the total thickness.

7. The test device of claim 6, wherein the force sensor is mounted to the reinforcement member.

8. The test device of claim 7, further comprising a data acquisition module mounted to the reinforcement member, the data acquisition module being in electrical communication with the force sensor to receive signals from the force sensor indicative of the push or pull force.

9. The test device of claim 1, wherein the housing portion includes four corner brackets, each corner bracket configured to engage two sides of a corresponding corner of the display device.

10. The test device of claim 1, wherein the first handle is located on a left side of the main body and the second handle is located on a right side of the main body.

11. The test device of claim 1, wherein the frame weighs less than or equal to 2 kg.

12. A test device comprising:
a frame including a first handle, a second handle, and a main body, the first and second handles extending from a perimeter of the main body and being configured to be gripped by opposite hands of an operator, wherein the main body includes a housing portion and a support portion, the housing portion being configured to hold a display device such that a display screen of the display device is visible from a rear side of the main body, wherein the support portion is disposed on a front side of the main body;
a force applicator extending in a forward direction away from the support portion;
a force sensor mounted to the support portion and coupling the force applicator to the support portion, the force sensor being configured to detect a push or pull force applied via the force applicator to a location on an object; and
a data acquisition module mounted to the support portion, the data acquisition module being in electrical communication with the force sensor to receive signals from the force sensor indicative of the push or pull force.

13. The test device of claim 12, further comprising at least one non-contact sensor supported by the main body and configured to measure distance to the location on the object.

14. The test device of claim 12, wherein the support portion includes a reinforcement member that extends longitudinally in a lateral direction that is perpendicular to the forward direction, the reinforcement member having a total length in the lateral direction, a total width in the forward direction, and a total thickness in a direction that is perpendicular to the lateral and forward directions, wherein the total length is greater than the total width and the total width is greater than the total thickness, wherein the force sensor is mounted to the reinforcement member.

15. A method of testing a vehicle panel, the method including:

supporting a force applicator, a force sensor, a data acquisition module, at least one non-contact sensor, and a display device on a frame, wherein the frame includes a first handle, a second handle, and a main body, the first and second handles extending from a perimeter of the main body and being configured to be gripped by opposite hands of an operator; wherein the main body that includes a housing portion and a support portion, wherein the display device is mounted to the housing portion such that a display screen of the display device is visible from a rear side of the main body, wherein the support portion is disposed on a front side of the main body, wherein the force applicator is mounted to the support portion and extends in a forward direction therefrom;

positioning the frame such that the force applicator contacts the vehicle panel;

moving the frame relative to the vehicle panel until the vehicle panel deforms or until a force detected by the force sensor reaches a predetermined threshold force; and measuring a deflection amount of the vehicle panel with the at least one non-contact sensor during the step of moving the frame relative to the vehicle panel.

16. The method of claim 15, wherein the step of moving the frame relative to the vehicle panel includes pushing the frame toward the vehicle panel to press the vehicle panel with the force applicator.

17. The method of claim 15, wherein the step of moving the frame relative to the vehicle panel includes pulling the frame away from the vehicle panel to pull the vehicle panel with the force applicator.

18. The method of claim 15, wherein the at least one non-contact sensor includes a stereoscopic camera.

19. The method of claim 18, wherein the stereoscopic camera is in communication with the display device and the display device is configured to display at least one of: images from the stereoscopic camera, video from the stereoscopic camera, and distance data based on input from the stereoscopic camera.

20. The method of claim 15, further comprising placing coordinate markings on the vehicle panel, wherein the at least one non-contact sensor is configured to detect the coordinate markings.

\* \* \* \* \*